(12) United States Patent
Nielsen et al.

(10) Patent No.: US 11,988,646 B2
(45) Date of Patent: May 21, 2024

(54) APPARATUS AND METHOD FOR DETERMINING STRENGTH OF A SUBSTRATE AND PEAL STRENGTH OF A JOINT BETWEEN THE SUBSTRATE AND STRUCTURE WITH LOAD APPLYING ELEMENTS

(71) Applicant: LM Wind Power A/S, Kolding (DK)

(72) Inventors: Michael Wenani Nielsen, Kolding (DK); Jesper Thuesen, Kolding (DK)

(73) Assignee: LM Wind Power A/S, Kolding (DK)

( * ) Notice: Subject to any disclaimer, the term of this patent is extended or adjusted under 35 U.S.C. 154(b) by 135 days.

(21) Appl. No.: 17/689,341

(22) Filed: Mar. 8, 2022

(65) Prior Publication Data

US 2022/0291101 A1 Sep. 15, 2022

(30) Foreign Application Priority Data

Mar. 9, 2021 (EP) ..................................... 21161583

(51) Int. Cl.
*G01N 3/20* (2006.01)
*G01M 5/00* (2006.01)
(Continued)

(52) U.S. Cl.
CPC ............... *G01N 3/20* (2013.01); *G01N 19/04* (2013.01); *F03D 1/0675* (2013.01); *F05B 2240/30* (2013.01); *G01N 2203/0023* (2013.01)

(58) Field of Classification Search
CPC ......... G01B 17/02; F01D 5/147; F01D 5/141; F01D 25/00; B29C 70/882; B29C 70/443;
(Continued)

(56) References Cited

U.S. PATENT DOCUMENTS

| 5,231,882 A * | 8/1993 | Bertele .................... G01N 3/20 73/852 |
| 8,707,798 B2 | 4/2014 | Gregg et al. |
| 2010/0206062 A1 | 8/2010 | Yoon et al. |

FOREIGN PATENT DOCUMENTS

| CN | 103698225 B | 1/2016 | |
| CN | 115045804 A * | 9/2022 | ............. G01N 19/04 |

(Continued)

OTHER PUBLICATIONS

European Search Report Corresponding to EP21161583 dated Aug. 30, 2021.

*Primary Examiner* — Brandi N Hopkins
(74) *Attorney, Agent, or Firm* — Dority & Manning, P.A.

(57) ABSTRACT

The present invention relates to a apparatus for determining at least one a bending strength of a substrate and peel strength of a joint between a structure and the substrate. The apparatus includes a fixture configured to support the structure and a plurality of support beams positioned on either sides of the fixture and configured to support the substrate. Further, the apparatus includes a plurality of load applying members, which are configured to apply load onto the substrate to deform the substrate relative to the plurality of support beams. Furthermore, the apparatus includes a sensor, which is configured to determine parameters such as axial load induced in the structure, peel stress in the joint between the substrate and the structure and bending moments on the substrate during application of load onto the substrate, to determine at least one of the bending strength and the peel strength.

15 Claims, 6 Drawing Sheets

(51) Int. Cl.
*G01N 19/04* (2006.01)
*F03D 1/06* (2006.01)

(58) Field of Classification Search
CPC ..... B29C 70/541; B29C 70/42; F03D 1/0658;
F03D 17/00; F03D 1/0675; F03D 3/062;
F03D 1/0633; F03D 1/675; F03D 1/065;
B65H 35/06; B23P 15/04; G01M 5/0016;
B29D 99/0028; G01N 3/20; G01N 19/04;
G01N 2203/0023; F05B 2240/30
See application file for complete search history.

(56) References Cited

FOREIGN PATENT DOCUMENTS

| | | | | |
|---|---|---|---|---|
| EP | 2679980 | A2 | 1/2014 | |
| EP | 4056980 | A1 * | 9/2022 | ............. G01N 19/04 |
| JP | 2000094177 | A | 4/2000 | |
| WO | WO-2021239535 | A1 * | 12/2021 | .......... G01M 5/0016 |

* cited by examiner

APPARATUS AND METHOD FOR DETERMINING STRENGTH OF A SUBSTRATE AND PEAL STRENGTH OF A JOINT BETWEEN THE SUBSTRATE AND STRUCTURE WITH LOAD APPLYING ELEMENTS

FIELD OF THE INVENTION

Present invention relates in general to a field of wind turbines. Particularly, the present invention relates to an apparatus for determining at least one of bending strength of a substrate and peel strength of a joint between the substrate and a structure. Embodiments of the present invention relates to the apparatus for determining bending strength of a substrate of a shell and peel strength of a joint between the substrate and a reinforcing structure of the shell of a wind turbine blade.

BACKGROUND OF THE INVENTION

Wind power is one of the fastest-growing renewable energy technologies and provides a clean and environmentally friendly source of energy. Typically, wind turbines comprise a tower, generator, gearbox, nacelle, and one or more rotor blades. The kinetic energy of wind is captured using known aerofoil principles. Modern wind turbines may have rotor blades that exceed 90 meters in length.

Turbine blades are the primary elements of wind turbines for converting wind energy into electrical energy. The blades have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

Turbine blades are usually manufactured by forming a shell body from two shell parts or shell halves comprising layers of woven fabric or fibre and resin. Spar caps or main laminates are placed or integrated in the shell halves and may be combined with shear webs or spar beams to form structural support members. Spar caps or main laminates may be joined to, or integrated within, the inside of the suction and pressure halves of the shell.

The shear web is generally bonded or connected to spar caps using suitable bonding paste or adhesive or compound, thus forming bond line or joint between the shear web and the shells, thus connecting the shells. During operation of the wind turbine, wind turbine blade may be subjected to loads, as a result of which bending moments may be generated in the pressure side shell part and in the suction side shell part. The bending moments may deform (i.e., resulting in change in shape) the wind turbine blade typically from an airfoil shape to an oval shape. This deformation or change in shape of the blade may impose stresses in the components such as shear web, spar cap, adhesive joint between the shear web and the spar cap. The stresses may ultimately cause the components to fail, leading to failure of the blade, which may be undesired.

Accordingly, the industry would benefit from a apparatus/system for determining at least one of a bending strength of a substrate of a shell and peel strength of a joint between the substrate and a reinforcing structure of the shell of a wind turbine blade, for improving service life of the blade.

SUMMARY OF THE INVENTION

In one non-limiting embodiment of the present invention, an apparatus for determining at least one of a bending strength of a substrate and peel strength of a joint between the substrate and a structure, is disclosed. The apparatus includes a fixture configured to support the structure and a plurality of support beams, each defined with a rolling support at a free end. At least one of the plurality of support beams is provided on either side of the fixture for supporting the substrate, which is joined to the structure. Further, the apparatus includes a plurality of load applying members, configured to apply load onto the substrate, such that the substrate deforms relative to the plurality of support beams, for determining at least one of the bending strength of the substrate and peel strength of the joint between the substrate and the structure.

In an embodiment of the present invention, the structure is rigidly supported in the fixture by a mechanical joining process.

In an embodiment of the present invention, wherein the rolling support is a ball joint.

In an embodiment of the present invention, the apparatus includes a sensor for detecting parameters during application of load onto the substrate, till failure of at least one of the substrate, the structure and the joint between the structure and the substrate.

In an embodiment of the present invention, the parameters detected by the sensor include: axial load induced in the structure; peel stress in the joint between the substrate and the structure and bending moments on the substrate.

In an embodiment of the present invention, the sensor comprises at least one of: a force transducer; an extensometer; and a load cell.

In an embodiment of the present invention, the deformation of the substrate relative to the plurality of support beams defines a curve.

In an embodiment of the present invention, the apparatus comprises a base configured to support the fixture and the plurality of support beams.

In another non-limiting embodiment of the present invention, method for determining at least one of a bending strength of a substrate and peel strength of a joint between the substrate and a structure, is disclosed. The method includes a step of supporting, the structure in a fixture, and supporting the substrate on a rolling support defined at a free end of each of a plurality of support beams, wherein the substrate and the structure are joined to each other. Further, the method includes a step of applying, load onto the substrate by a plurality of load applying members to deform the substrate relative to the plurality of support beams, wherein the deformation induces a tensile load in the structure and peel stress in the joint. Furthermore, the method includes a step of determining at least one of the bending strength of the substrate, peel strength of the joint and tensile strength of the structure, based on parameters detected by a sensor during application of the load onto the substrate.

In yet another non-limiting embodiment of the present invention, a system for determining at least one of a bending strength of a substrate of a shell and peel strength of a joint between the substrate and a reinforcing structure of the shell of a wind turbine blade is disclosed. The system includes a fixture configured to support the structure and a plurality of support beams, each defined with a rolling support at a free end. At least one of the plurality of support beams is provided on either side of the fixture for supporting the substrate, which is joined to the structure. Further, the system includes a plurality of load applying members, configured to apply load onto the substrate, such that the substrate deforms relative to the plurality of support beams, for determining at least one of the bending strength of the substrate and peel strength of the joint between the substrate and the structure.

As used herein in several places, the term "apparatus" is used to describe a device used to determine at least one of the bending strength of a substrate and peel strength of a joint between the substrate and a structure, in general and the term "system" is used to describe a device for determining at least one of the bending strength of a substrate of a shell and peel strength of a joint between the substrate and a reinforcing structure of the shell of a wind turbine blade.

Various other features will be apparent from the following detailed description and the drawings.

DESCRIPTION OF THE INVENTION

The invention is explained in detail below with reference to an embodiment shown in the drawings, in which FIG. 1 shows a wind turbine, FIG. 2 shows a schematic view of a wind turbine blade, FIG. 3 is a schematic cut-open view of the wind turbine blade, FIG. 4 is a magnified view of the encircled section in FIG. 3, FIG. 5 shows a schematic view of a cross-section of a wind turbine blade, FIG. 6 shows a perspective view of an apparatus, according to the present invention.

DETAILED DESCRIPTION

Figure 1:
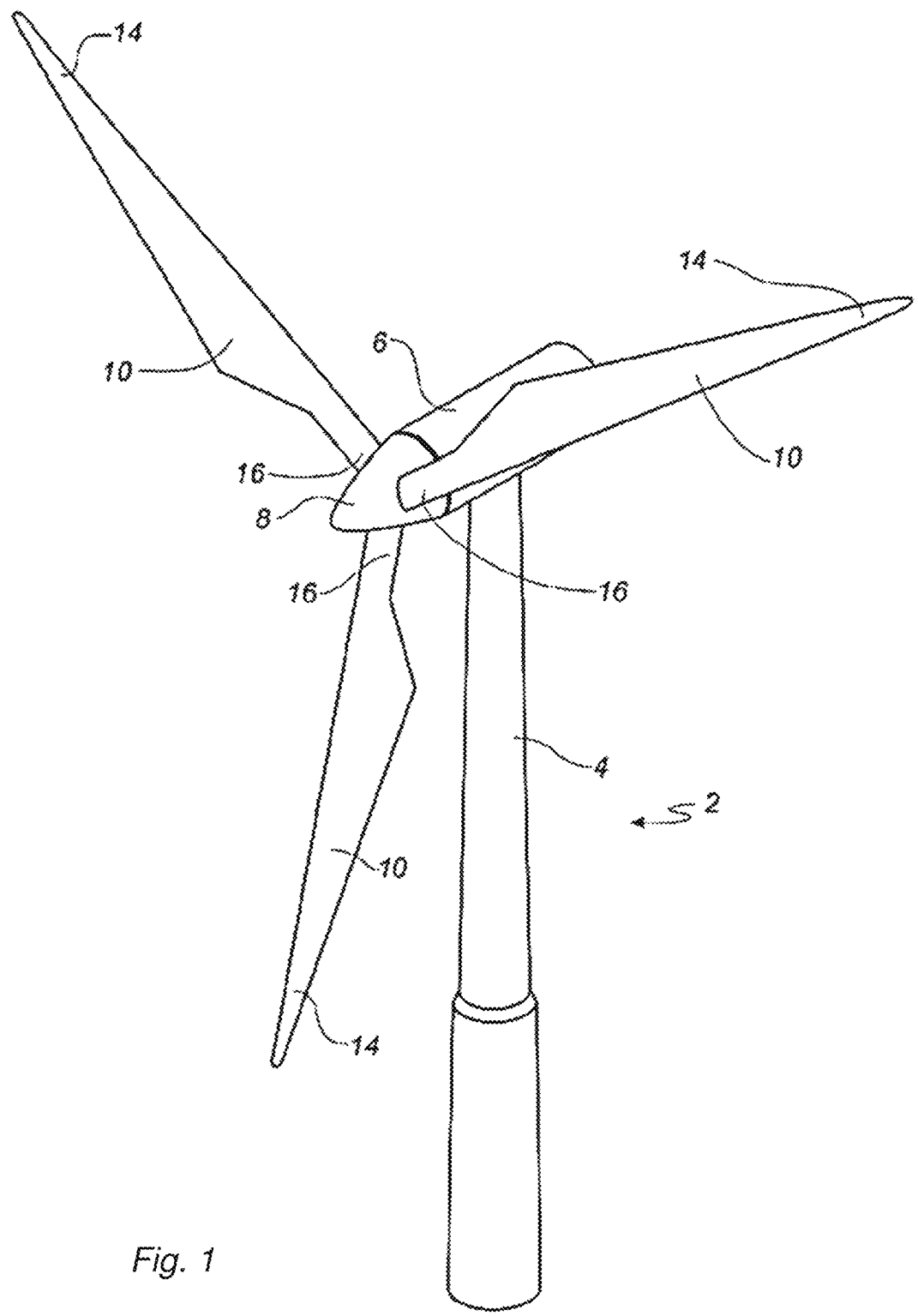

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub 8 and a blade tip 14 farthest from the hub 8.

Figure 2:
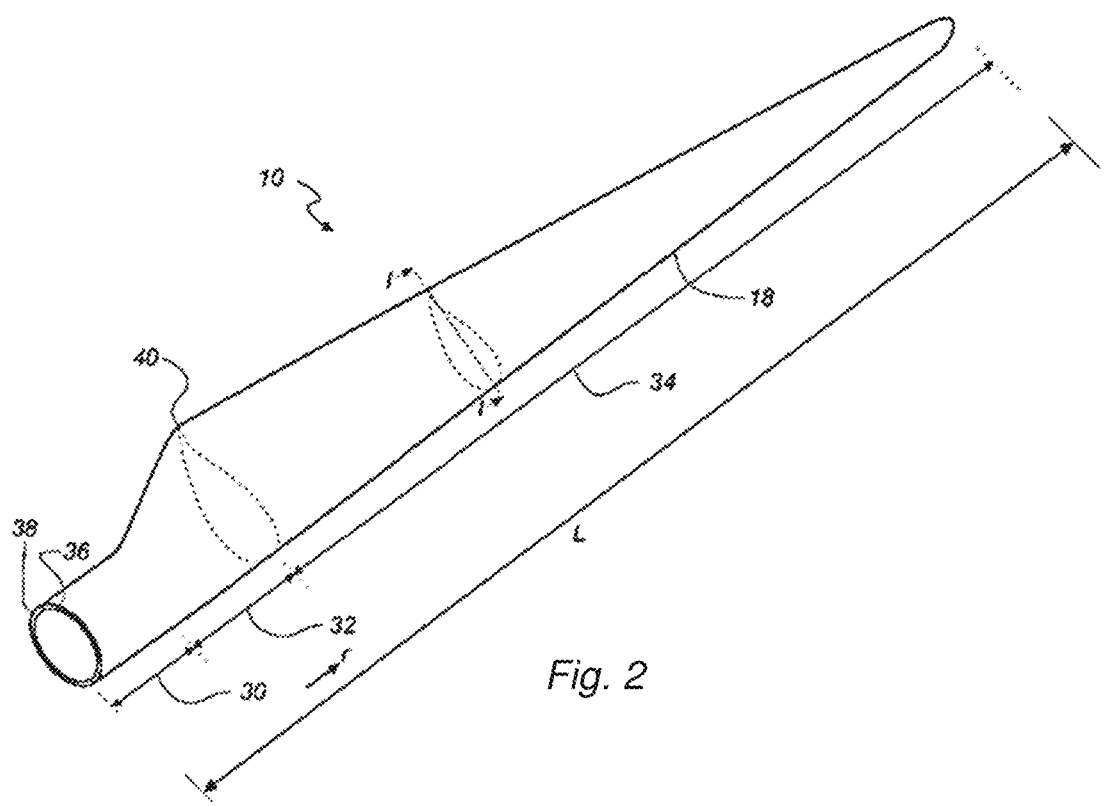

FIG. 2 shows a schematic view of a wind turbine blade 10. The wind turbine blade 10 has the shape of a conventional wind turbine blade 10 and comprises a root region 30 closest to the hub 8, a profiled or an airfoil region 34 farthest away from the hub 8 and a transition region 32 between the root region 30 and the airfoil region 34. The blade 10 comprises a leading edge 18 facing the direction of rotation of the blade 10, when the blade 10 is mounted on the hub 8, and a trailing edge 20 facing the opposite direction of the leading edge 18.

The airfoil region 34 (also called the profiled region) has an ideal or almost ideal blade 10 shape with respect to generating lift, whereas the root region 30 due to structural considerations has a substantially circular or elliptical cross-section, which for instance makes it easier and safer to mount the blade 10 to the hub 8. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub 8. The airfoil region 34 has an airfoil profile with a chord extending between the leading edge 18 and the trailing edge 20 of the blade 10. The width of the chord decreases with increasing distance r from the hub 8.

A shoulder 40 of the blade 10 is defined as the position, where the blade 10 has its largest chord length. The shoulder 40 is typically provided at the boundary between the transition region 32 and the airfoil region 34. FIG. 2 also illustrates the longitudinal extent L, length, or longitudinal axis of the blade 10.

It should be noted that the chords of different sections of the blade 10 normally do not lie in a common plane, since the blade 10 may be twisted and/or curved (i.e., pre-bent), thus providing the chord plane with a correspondingly twisted and/or curved course, this being most often the case to compensate for the local velocity of the blade 10 being dependent on the radius from the hub 8.

The blade 10 is typically made from a pressure side shell part 36 and a suction side shell part 38 that are glued to each other along bond lines at the leading edge 18 and the trailing edge 20 of the blade 10.

Figure 3:
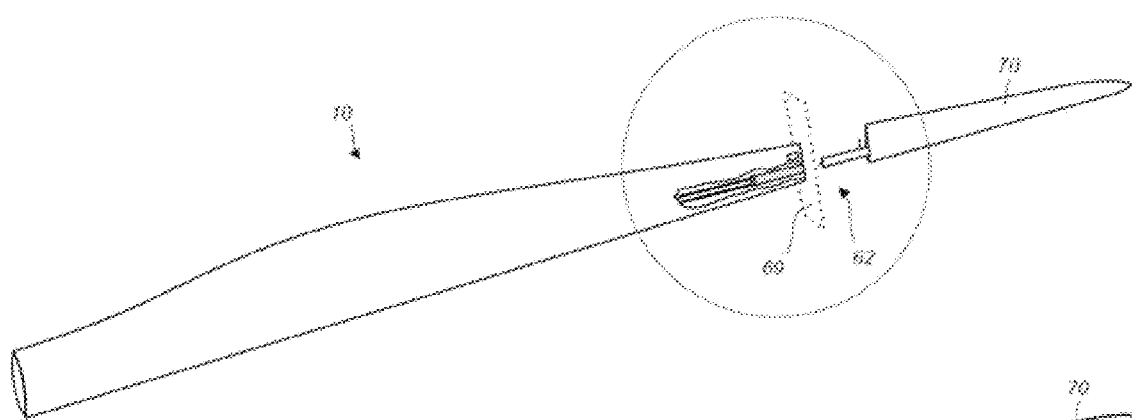
Figure 4:
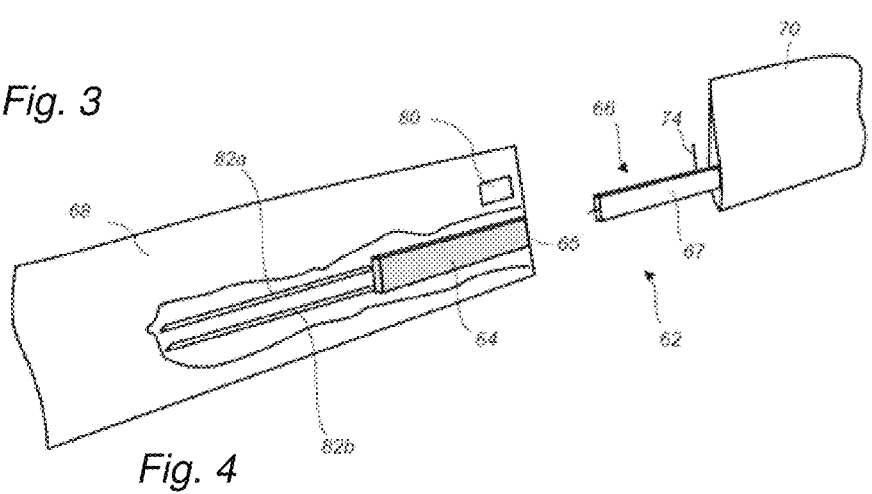

FIG. 3 is a schematic cut-open, exploded view of a wind turbine blade 10 according to a present invention, wherein FIG. 4 is an enlarged view of the encircled section in FIG. 4. The wind turbine blade 10 comprises a first blade segment 70 and a second blade segment 68 according to the present invention. The first blade segment 70 and the second blade segment 68 extends in opposite directions from a chord-wise joint 79. In an embodiment, the first blade segment 70 is a tip end segment and the second blade segment 68 is a root end segment and both includes a pressure side shell member 36 and a suction side shell member 38.

Figure 5:
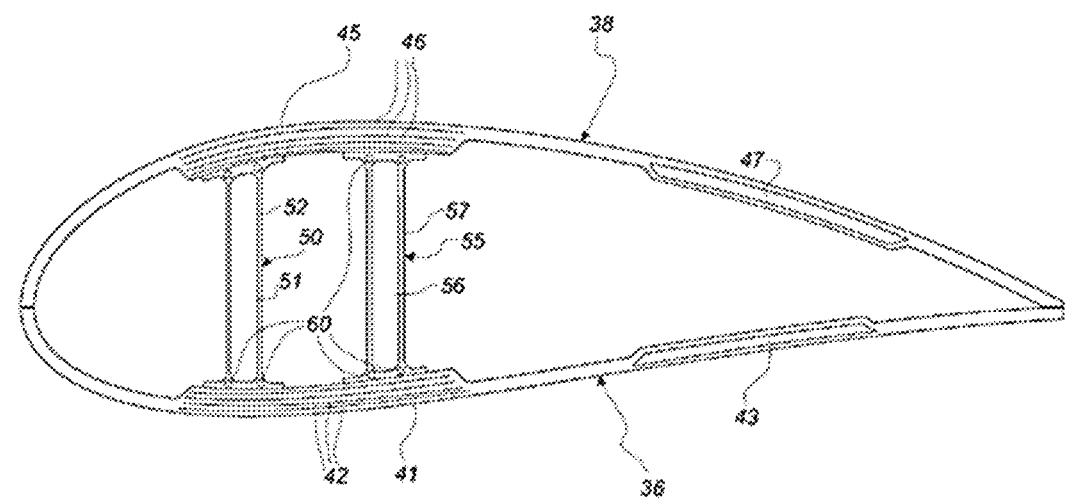

FIG. 5 shows a schematic view of a cross section of the blade 10 along the line I-I shown in FIG. 2. As previously mentioned, the blade 10 comprises a pressure side shell part 36 and a suction side shell part 38. The pressure side shell part 36 comprises a spar cap 41, also called a main laminate, which constitutes a load bearing part of the pressure side shell part 36. The spar cap 41 comprises a plurality of fibre layers 42 mainly comprising unidirectional fibres aligned along the longitudinal direction of the blade 10 in order to provide stiffness to the blade 10. The suction side shell part 38 also comprises a spar cap 45 comprising a plurality of fibre layers 46. The pressure side shell part 38 may also comprise a sandwich core material 43 typically made of balsawood or foamed polymer and sandwiched between a number of fibre-reinforced skin layers 52. The sandwich core material 43 is used to provide stiffness to the shell in order to ensure that the shell substantially maintains its aerodynamic profile during rotation of the blade 10. Similarly, the suction side shell part 38 may also comprise a sandwich core material 47.

The spar cap 41 of the pressure side shell part 36 and the spar cap 45 of the suction side shell part 38 are connected via a first shear web 50 and a second shear web 55. The shear webs 50, 55 are shown in the embodiment, shaped as substantially I-shaped webs. The first shear web 50 comprises a shear web body and two web foot flanges. The shear web body comprises a sandwich core material 51, such as balsawood or foamed polymer, covered by a number of skin layers 52 made of a number of fibre layers 42. The blade shells 36, 38 may comprise further fibre-reinforcement at the leading edge 18 and the trailing edge 20. Typically, the shell parts 36, 38 are bonded to each other via glue flanges.

During operation of the wind turbine, wind turbine blade 10 may be subjected to loads, as a result of which bending moments may be generated in the pressure side shell part 36 and in the suction side shell part 38. The bending moments may deform (i.e. resulting in change in shape) of the wind turbine blade 10 typically from an airfoil shape to an oval shape. This deformation or change in shape of the blade 10 may impose stresses in the components such as shear web, spar cap 41, adhesive joint 79 between the shear web and the spar cap 41. The stresses may ultimately cause the components to fail, leading to failure of the blade 10, which is undesired. Hence, it would be advantageous to determine the bending strength of the shear web, peel strength of the adhesive joint 79 between the shear web and the spar cap 41, based on which the wind turbine may be suitably installed in the desired environment, and thus increasing service life of the wind turbine blade 10.

Figure 6:
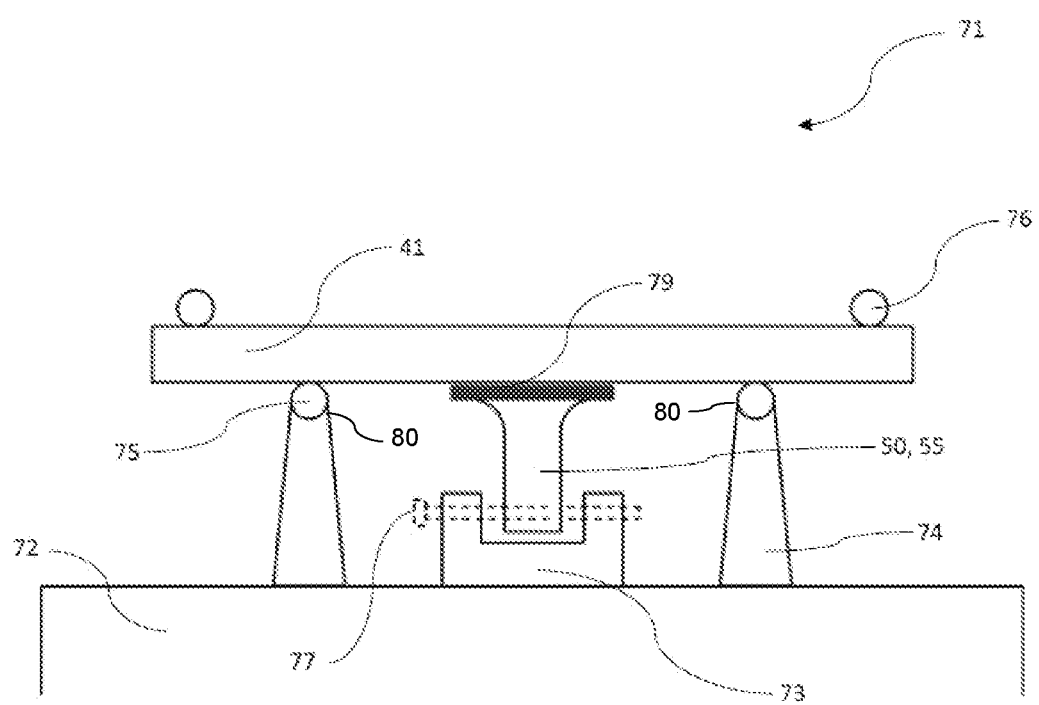

Accordingly, FIG. 6 illustrates an apparatus 71 for determining at least one of a bending strength of a substrate and peel strength of a joint between the substrate and a structure, according to a present invention. In an exemplary embodiment, the apparatus 71 may be adapted to determine the bending strength of the substrate such as a spar cap 41 of the wind turbine blade 10 and peel strength of a joint 79 between the substrate and a reinforcing structure, such as a shear web (50, 55) of the wind turbine blade 10. However, the same cannot be considered as a limitation, as the apparatus 71 may be adapted to determine at least one of the bending strength of a substrate and peel strength of a joint 79 between the substrate and the structure of other types of wind-exposed surfaces negotiating aerodynamic forces, resistance, and aerodynamics, such as helicopter rotor blades or fan blades.

As shown in FIG. 6, the apparatus 71 may include a base 72, configured to support other components of the apparatus 71. The apparatus 71 may include a fixture 73, supported on the base 72 and may configured to support the reinforcement structure such as a shear web (50, 55) of the wind turbine blade 10. The fixture 73 may be configured to rigidly support an end of the reinforcing structure 50, 55. In an illustrated embodiment, the fixture 73 may include a substantially U-shape configuration, so as to receive one end of the reinforcement structure 50, 55. Sides of the fixtures 73 may be de-fined with at least one aperture such that, the reinforcement structure 50, 55 may be rigidly supported by mechanical joining process such as but not limiting to fasteners 77. That is, the end of the reinforcement structure may be positioned in the fixture 73 and a fastener 77 may extend through the apertures on the sides of the fixture 73 and through the reinforcement structure, such that the reinforcement structure may be rig-idly supported by the fixture 73. Further, the apparatus 71 may include a plurality of support beams 74, which may be provided on either sides of the fixture 73. Each of the plurality of support beams 74 may extend vertically from the base 72 and may be configured to support the substrate, which may be joined to the reinforcing structure.

Further referring to FIG. 6, the apparatus 71 may include a plurality of load applying member 76, which may include a rolling support 75 at a free end. The plurality of load applying members may be configured to make a surface contact with the substrate and apply load onto the substrate during testing, to deform (thus, bend) the substrate relative to the plurality of support beams 74. Additionally, the apparatus 71 may include a sensor 78 such as but not limiting to a force transducer, an extensometer, and a load cell. The sensor 78 may be configured to determine parameters during application of the load (i.e., during the testing), till failure of at least one of the substrate and the reinforcing structure and the joint 79 between the substrate and the reinforcing structure, for determining at least one of the bending strength of the substrate and peel strength of the joint 79 between the substrate and the reinforcing structure.

In an embodiment, the parameters detected by the sensor 78 may include axial load induced in the reinforcing structure, peel stress in the joint 79 between the substrate and the reinforcing structure and bending moments on the substrate which may be analysed further to determine at least one of the bending strength of the reinforcement structure and peel strength of the joint 79 between the reinforcement structure and the substrate. In some embodiments, the sensor 78 may be communicatively coupled to a control unit [not shown]. The control unit includes set of instructions to receive the inputs from the sensor 78 and determine the axial load induced in the reinforcing structure, peel stress in the joint 79 between the substrate and the reinforcing structure and bending moments on the substrate.

In an embodiment and as apparent from FIG. 6, each of the plurality of support beams 74 may be defined with a rolling support 75 at a free end 80 of each support beam 74, The rolling support 75 may be a ball joint and may be configured to facilitate bending of the substrate during application of the load, so as to define a curve, thus defining shape of deformation of the blade 10 in real-time conditions.

In an embodiment, configuration of the apparatus 71 allow to apply load on to the substrate (i.e., the spar cap 41 of the wind turbine 2) during testing. This results in bending of the substrate, which corresponds to a real time bending, which is caused due change in shape of the wind turbine blade 10. Thus, the configuration of the apparatus 71 facilitates in testing the components of the wind turbine blade 10 by mimicking real time conditions, and thus providing accurate results. Based on the strengths determined, the wind turbine blades 10 may be installed in suitable environments.

Figure 8:
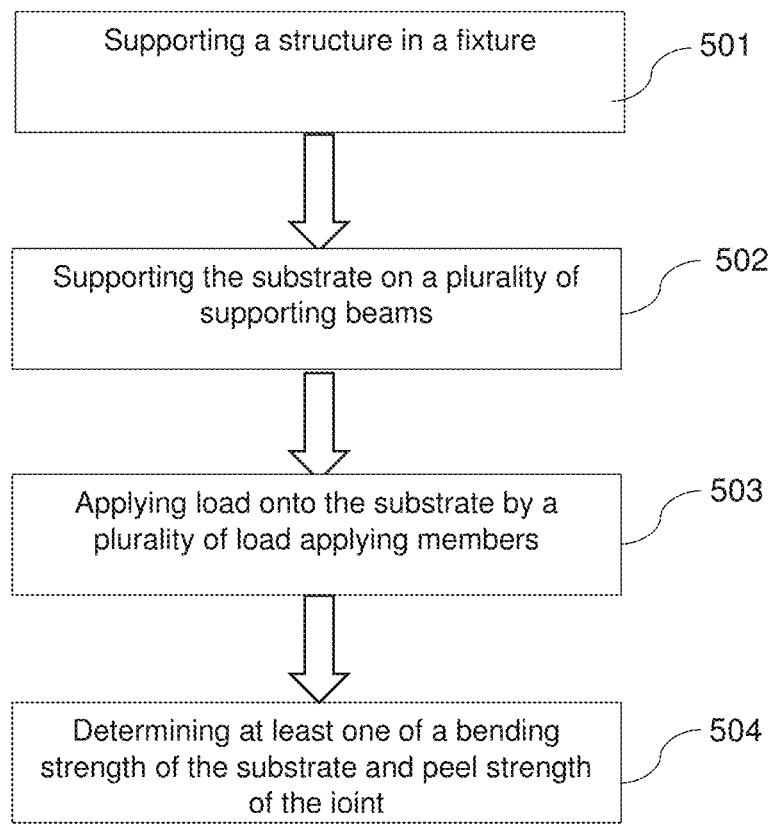
FIG. 8 is a flow chart of a method of determining at least one of a bending strength of a substrate and peel strength of a joint between the substrate and a structure, according to the present invention.

Referring now to FIG. 8, illustrates a flow chart of a method for determining at least one of the bending strength of the substrate and peel strength of the joint 79 between the substrate and the structure. At block 501, the structure may be supported in a fixture 73. In an embodiment, the structure may be rigidly supported in the fixture 73 by mechanical joining process such as fasteners. Once, the structure is supported in the fixture 73 at block 502, the substrate may be supported on the rolling support 75 defined at a free end of each of the plurality of support beams 74, with the substrate and the structure being joined to each other using suitable adhesives, forming a joint 79 or a bond line.

Figure 7:
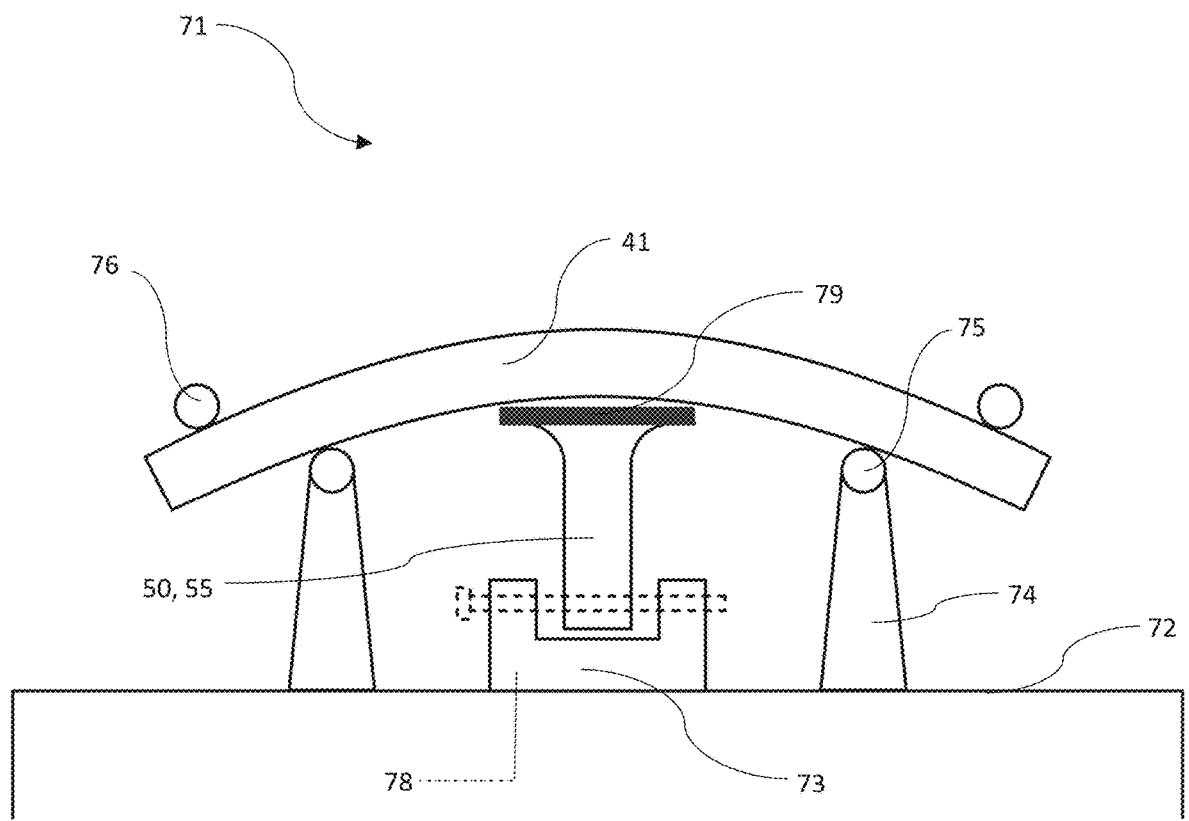
FIG. 7 shows a perspective view of the apparatus, with load applied onto the substrate, according to the present invention.

At block 503, load may be applied onto the substrate by a plurality of load applying members. In an exemplary embodiment, load may be applied on either sides of the substrate resulting in a four point bending. Due to application of the load, the substrate may deform (thus, bend) [best seen in FIG. 7], relative to the plurality of support beams 74. In an embodiment, the deformation of the substrate may induce tensile load in the structure and peel stresses in the joint 79 between the substrate and the structure.

At block 504, during application of load onto the substrate, the sensor 78 may detect the parameters including axial load induced in the structure; peel stress in the joint 79 between the substrate; and the structure and bending moments on the substrate. The load application onto the substrate may be continued till failure of at least one of the substrate, the structure and the joint 79 between the structure and the substrate. The parameters detected at the point of failure may be computed to determine at least one of the bending strength of a substrate and peel strength of a joint 79 between the substrate and a structure.

In an embodiment, in an embodiment the apparatus 71 may be configured to apply tensile loads onto the substrate such that compressive loads may be induced in the structure, and accordingly the bending strength of the substrate may be determined under tensile loading condition of the substrate and compressive loading condition of the structure.

Exemplary embodiments of the present disclosure are set out in the following items:

1. An apparatus for determining at least one of a bending strength of a substrate and peel strength of a joint between the substrate and a structure, the apparatus comprising:
   a fixture configured to support the structure;
   a plurality of support beams, each defined with a rolling support at a free end, wherein at least one of the plurality of support beams is provided on either side of the fixture for supporting the substrate, which is joined to the structure; and
   a plurality of load applying members, configured to apply load onto the substrate, such that the substrate deforms relative to the plurality of support beams, for determining at least one of the bending strength of the substrate and peel strength of the joint between the substrate and the structure.
2. The apparatus according to item 1, wherein the structure is rigidly supported in the fixture by a mechanical joining process.
3. The apparatus according to any of items 1-2, wherein the rolling support is a ball joint.
4. The apparatus according to any of items 1-3, comprises a sensor for detecting parameters during application of load onto the substrate, till failure of at least one of: the substrate, the structure and the joint between the structure and the substrate.
5. The apparatus according to item 4, wherein the parameters detected by the sensor comprises: axial load induced in the structure; peel stress in the joint between the substrate and the structure; and bending moments on the substrate.
6. The apparatus according to any of items 4-5, wherein the sensor comprises at least one of: a force transducer; an extensometer; and a load cell.
7. The apparatus according to any of items 1-6, wherein the plurality of load applying members comprises a rolling support at a free end for applying load onto the substrate.
8. The apparatus according to any of items 1-7, wherein the deformation of the substrate relative to the plurality of support beams defines a curve.
9. The apparatus according to any of items 1-8, comprises a base configured to support the fixture and the plurality of support beams.
10. A method for determining at least one of a bending strength of a substrate and peel strength of a joint between the substrate and a structure, the method comprising:
    supporting, the structure in a fixture;
    supporting, the substrate on a rolling support defined at a free end of each of a plurality of support beams, wherein the substrate and the structure are joined to each other;
    applying, load onto the substrate by a plurality of load applying members to deform the substrate relative to the plurality of support beams, wherein the deformation induces a tensile load in the structure and peel stress in the joint; and
    determining at least one of the bending strength of the substrate, peel strength of the joint and tensile strength of the structure, based on parameters detected by a sensor during application of the load onto the substrate.
11. The method according to item 10, wherein the sensor detects the parameters till failure o:f at least one of the substrate; the structure; and the joint between the substrate and the structure.
12. The method according to any of items 10-11, wherein the parameters detected by the sensor comprises an axial load induced in the structure; peel stress in the joint between the substrate and the structure; and bending moments on the substrate.
13. A system for determining at least one of a bending strength of a substrate of a shell and peel strength of a joint between the substrate and a reinforcing structure of the shell of a wind turbine blade, the system comprising:
    a fixture configured to support the reinforcing structure;
    a plurality of support beams, each defined with a rolling support at a free end, wherein at least one the plurality of support beams is provided on either side of the fixture for supporting the substrate, which is joined to the reinforcing structure;
    a plurality of load applying members, configured to apply load onto the substrate, such that the substrate deforms relative to the plurality of support beams; and
    a sensor for detecting parameters during application of the load onto the substrate, for determining at least one of the bending strength of the substrate and peel strength of the joint between the substrate and the reinforcing structure.
14. The system according to item 13, wherein the substrate is a spar of the wind turbine blade.
15. The system according to any of items 13-14, wherein the reinforcing structure is a shear web of the wind turbine blade.
16. The system according to any of items 13-15, wherein the sensor detects the parameters till failure of at least one of: the substrate; the reinforcing structure; and the joint between the substrate and the reinforcing structure.
17. The system according to any of items 13-16, wherein the parameters detected by the sensor comprises: axial load induced in the reinforcing structure; peel stress in the joint between the substrate; and the reinforcing structure and bending moments on the substrate.
18. The system according to any of items 13-17, wherein the reinforcing structure is rigidly supported in the fixture by mechanical joining process.
19. The system according to any of items 13-18, wherein the sensor comprises one of: a force transducer; an extensometer; and a load cell, and the rolling support is a ball joint.
20. The system according to any of items 13-19, wherein the plurality of load applying members comprises a rolling support at a free end, for applying load onto the substrate.

LIST OF REFERENCE NUMERALS

2 wind turbine
4 tower
6 nacelle
8 hub 10 blade
14 blade tip
16 blade root
18 leading edge
20 trailing edge
30 root region
32 transition region
34 airfoil region
36 pressure side shell part
38 suction side shell part
40 shoulder
41 spar cap
42 fibre layers
43 sandwich core material
46 fibre layers
47 sandwich core material
50 first shear web
51 core member
52 skin layers
55 second shear web
56 sandwich core material of second shear web
57 skin layers of second shear web
60 filler ropes
68 second blade segment
70 first blade segment
71 apparatus
72 base
73 fixture
74 support beams
75 rolling support
76 load applying member
77 fastener
78 sensor
79 joint

The invention claimed is:

1. An apparatus for determining at least one of a bending strength of a substrate or a peel strength of a joint between the substrate and a structure, the apparatus comprising:
    a fixture configured to support the structure, wherein the substrate is joined to the structure;
    a plurality of support beams, each support beam defined with a rolling support at a free end, wherein at least one of the plurality of support beams is provided on either side of the fixture for supporting the substrate; and
    a plurality of load applying members configured to apply load onto a surface of the substrate outboard of the support beams such that the substrate deforms relative to the plurality of support beams, the applied load used to determine at least one of the bending strength of the substrate and peel strength of the joint between the substrate and the structure.

2. The apparatus according to claim 1, wherein the structure is rigidly supported in the fixture by a mechanical joining process.

3. The apparatus according to claim 1, wherein the rolling support is a ball joint.

4. An apparatus for determining at least one of a bending strength of a substrate or a peel strength of a joint between the substrate and a structure, the apparatus comprising:
    a fixture configured to support the structure, wherein the substrate is joined to the structure;
    a plurality of support beams, each support beam defined with a rolling support at a free end, wherein at least one of the plurality of support beams is provided on either side of the fixture for supporting the substrate;
    a plurality of load applying members configured to apply load onto the substrate such that the substrate deforms relative to the plurality of support beams, the applied load used to determine at least one of the bending strength of the substrate and peel strength of the joint between the substrate and the structure; and
    further comprising a sensor configured to detect parameters during application of the load onto the substrate until failure of at least one of: the substrate, the structure, or the joint between the structure and the substrate.

5. The apparatus according to claim 1, wherein the plurality of load applying members comprise a rolling support at a free end for applying load onto the substrate.

6. The apparatus according to claim 1, wherein the deformation of the substrate relative to the plurality of support beams defines a curve.

7. The apparatus according to claim 1, further comprising base that supports the fixture and the plurality of support beams.

8. A method for determining at least one of a bending strength of a substrate or a peel strength of a joint between the substrate and a structure, the method comprising:
    supporting the structure in a fixture;
    supporting the substrate on a rolling support defined at a free end of each of a plurality of support beams, wherein the substrate and the structure are joined to each other;
    applying load onto a surface of the substrate outboard of the support beams by a plurality of load applying members to deform the substrate relative to the plurality of support beams, wherein the deformation induces a tensile load m the structure and peel stress m the joint; and
    determining at least one of the bending strength of the substrate, peel strength of the joint, or tensile strength of the structure based on parameters detected by a sensor during application of the load onto the substrate.

9. A method for determining at least one of a bending strength of a substrate or a peel strength of a joint between the substrate and a structure, the method comprising:
    supporting the structure in a fixture;
    supporting the substrate on a rolling support defined at a free end of each of a plurality of support beams, wherein the substrate and the structure are joined to each other;
    applying load onto the substrate by a plurality of load applying members to deform the substrate relative to the plurality of support beams wherein the deformation induces a tensile load in the structure and peel stress in the joint;
    determining at least one of the bending strength of the substrate, peel strength of the joint, or tensile strength of the structure based on parameters detected by a sensor during application of the load onto the substrate; and
    wherein the sensor detects the parameters until failure of at least one of the substrate, the structure, or the joint between the substrate and the structure.

10. The method according to claim 8, wherein the parameters detected by the sensor comprise: an axial load induced in the structure; peel stress in the joint between the substrate and the structure; and bending moments on the substrate.

11. A system for determining at least one of a bending strength of a substrate of a shell or a peel strength of a joint between the substrate and a reinforcing structure of the shell of a wind turbine blade, the system comprising:
    a fixture configured to support the reinforcing structure, the substrate joined to the reinforcing structure;

a plurality of support beams, each support beam defined with a rolling support at a free end, wherein at least one the plurality of support beams is provided on either side of the fixture for supporting the substrate;

a plurality of load applying members configured to apply load onto a surface of the substrate outboard of the support beams such that the substrate deforms relative to the plurality of support beams; and a sensor that detects parameters during application of the load onto the substrate for determining at least one of the bending strength of the substrate or the peel strength of the joint between the substrate and the reinforcing structure.

12. The system according to claim 11, wherein the substrate is a spar of the wind turbine blade.

13. The system according to claim 11, wherein the reinforcing structure is a shear web of the wind turbine blade.

14. A system for determining at least one of a bending strength of a substrate of a shell or a peel strength of a joint between the substrate and a reinforcing structure of the shell of a wind turbine blade, the system comprising:

a fixture configured to support the reinforcing structure, the substrate joined to the reinforcing structure;

a plurality of support beams, each support beam defined with a rolling support at a free end, wherein at least one the plurality of support beams is provided on either side of the fixture for supporting the substrate;

a plurality of load applying members configured to apply load onto the substrate such that the substrate deforms relative to the plurality of support beams;

a sensor that detects parameters during application of the load onto the substrate for determining at least one of the bending strength of the substrate or the peel strength of the joint between the substrate and the reinforcing structure; and wherein the sensor is configured to detect the parameters until failure of at least one of the substrate, the reinforcing structure, or the joint between the substrate and the reinforcing structure.

15. The system according to claim 11, wherein the reinforcing structure is rigidly supported in the fixture by a mechanical joining process, wherein the sensor comprises one of a force transducer; an extensometer; or a load cell, wherein the rolling support is a ball joint, and wherein the plurality of load applying members comprises a rolling support at a free end for applying load onto the substrate.

* * * * *